United States Patent [19]

Fair, Sr.

[11] 4,434,199
[45] Feb. 28, 1984

[54] METHOD OF MANUFACTURING A THIN NET AND PRODUCT

[75] Inventor: Timothy K. Fair, Sr., Blaine, Minn.

[73] Assignee: Conwed Corporation, St. Paul, Minn.

[21] Appl. No.: 428,040

[22] Filed: Sep. 29, 1982

[51] Int. Cl.³ .............................................. B32B 3/10
[52] U.S. Cl. .................................. 428/134; 156/168;
156/181; 156/246; 156/247; 156/344;
264/DIG. 47; 264/214; 264/288.8; 427/171;
427/333; 428/131; 428/137; 428/156; 428/167;
428/255; 428/910
[58] Field of Search ............... 264/145, 146, DIG. 47,
264/154, 171, 214, 288.8; 428/109, 111, 247,
255, 105, 156, 167, 131, 134, 137, 910; 156/344,
244.24, 246, 247, 168, 181; 427/333, 171

[56] References Cited
U.S. PATENT DOCUMENTS 3,515,778  6/1970  Fields et al. ................ 264/DIG. 47
3,851,034  11/1974  Harmon et al. ........... 264/DIG. 47
4,013,752  3/1977  Kalwaites et al. .......... 264/DIG. 47

FOREIGN PATENT DOCUMENTS 1393526  5/1975  United Kingdom ....... 264/DIG. 47

Primary Examiner—James J. Bell
Attorney, Agent, or Firm—Eyre, Mann, Lucas & Just

[57] ABSTRACT

A method of manufacturing a thin net by a polycondensation reaction is disclosed. One of the reactants is deposited upon a template and subsequently the second reactant is also deposited on the template. An embossed structure is obtained which can then be biaxially oriented to form a net sheet if desired.

7 Claims, 1 Drawing Figure

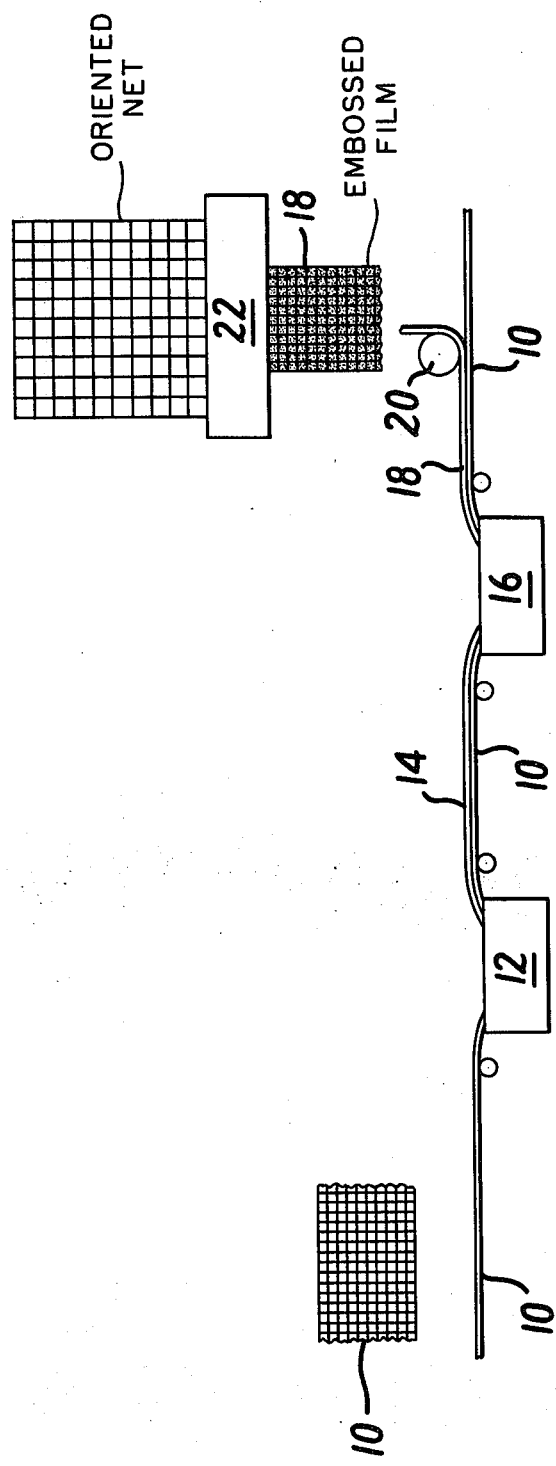

METHOD OF MANUFACTURING A THIN NET AND PRODUCT

The invention relates to a process for making a thin flat net structure. In particular, it relates to a process of making a net from polycondensation reactio polymers which because of low melt strength are not easily extrudable.

Because of the relatively high melt strength required of heated resins in an extrusion process, there are many materials which are necessarily excluded from the extrusion process. Some of these materials are lightweight and are otherwise quite satisfactory in terms of tensile strength for applications as plastic net structures. It has been found that in accordance with the inventive method disclosed a flat net product can be manufactured from many of these resins by polycondensation reaction. In accordance with the invention, a template for the reacting polymers is formed from a netting structure having integral joints. Suitable, the template, is a conventional extruded, unoriented polypropylene, square-mesh net available from many manufacturers, such as Conwed Corporation, St. Paul Minnesota. It has been found that a woven net structure or one in which the joints are overlaid is not suitable for the process in accordance with the invention.

Further in accordance with the invention, the flat surface of the net is coated, by suitable means such as dipping into a bath, with a first predetermined polymer reactant. When the first polymer reactant is of proper viscosity, it forms a continuous coating occluding the are between the strands of the net template as well as coating the strands thereof. The net template with the first reactant polymer film adhering thereto is subsequently bathed in a second predetermined reactant polymer chosen so that a polycondensation reaction takes place with the polymer on the template. The choice of reactants may be made from the known families of polycondensation polymers including but not limited to polyamides, polyesters, and polyester amides.

A polycondensation resin film is thus formed on the template, which film retains the shape of the film of the first polymer. Once the reaction is complete, the resin thus formed may be stripped from the net template. In this state the polymerized resin sheet has the form of film having embossed ribs thereon the pattern of the net template in which it was coated.

The embossed sheet is then oriented by stretching in at least one direction and preferably in both longitudinal and transverse directions. The orienting opens apertures in the film in the areas between the ribs to form a true net structure. After orienting, the ribs of the embossed sheet from the strands of the net structure.

The net in accordance with the invention is remarkably thin and light-weight. Further, it exhibits highly desirable flat joints and high strength. It will be further appreciated that because of the lack of an extrusion step, the process in accordance with the invention is adaptable to a bulk high rate process yielding considerable savings in both time and energy.

The process in accordance with the invention may be more fully understood in connection with the drawing wherein the FIGURE illustrates the process in schematic form.

A specific embodiment of the process for forming a light-weight net product of Nylon 66 according to the invention will be described in conjunction with this FIGURE.

Portions of the net template 10, a continuous square-meshed, unoriented extruded polypropylene net having integral joints and preferably a strand count of about 12 strands per inch in both longitudinal and transverse directions are fed to and immersed in a first bath 12.

It will be appreciated that the net template 10 may be the unoriented polypropylene net structure coming directly from an extruder for extruding net products. Such extruders are well known in the art and will not be further described. Alternatively the net template may simply be a continuous loop of net structure.

For the formation of Nylon 66, as one example the first bath is an aqueous solution of 1, 6-hexane diamine. The solvent concentration is selected such that the solution will cling to the strands and fill the apertures between the strands of the net template 10, the surface tension being such to form a continuous film thereon. It will be appreciated that the solvent concentration may be further adjusted to vary the thickness of the film of solution adhering to the template. Other known additives for viscosity control may also be included if desired.

The template portions having a continuous film 14 of 1, 6-hexane diamine adering thereto are carried from the first bath 12 and immersed in a second bath 16. Again, for this example of the production of Nylon 66 by a polycondensation reaction, the second bath 16 is suitably a solution of adipyl chloride. The bath also preferably includes a neutralizer, such as sodium hydroxide in a quantity in excess of that required to neutralize the acid produced by the polycondensation reaction of 1, 6-hexane diamine with adipyl chloride. Appropriate additives for neutralization may also be included in the solution as required for reactions of other reactant polymers known to those skilled in the art.

When the template 10, is immersed into the bath 16, the reaction of 1,6-hexane diamine with adipyl chloride proceeds to form a continuous film 18 of Nylon 66 where previously there was only 1,6-hexane diamine on the net template. After the film 18 is formed and set, the continuous film 18 is easily stripped from the template 10. In the schematic shown, the film passes over roller 20 which simply lifts it away from the adjacent strands of the template 10. Conventional doctor blades (not shown) may be used for the separation if desired. After being stripped from the template, the film 18 has the appearance of a thin film having ribs 20 embossed thereon in correspondence with the net pattern of the template 10.

Subsequently, the film is subjected to tension in both longitudinal and transverse directions by conventional means, such as tenter 22 for orienting the strands of the film 18. As the film 18 is oriented, the film in each of the areas between the ribs opens so as to form a true net structure. The orienting of the film 18 creates thereby a light-weight net structure having oriented strands.

It will be appreciated that the process may be utilized with any suitable choices of reactants in baths 12 and 16 which will yield a polycondensation product of suitable strength for net structures. It will be further appreciated that the net product created from the film 18 may have a variety of patterns depending only upon the pattern of the strands of the template. The thickness and weight of the net product, will be a function only of the viscosity of the reactants and/or the choice of reactants.

Thus there is taught a method for making a flat net product from a polycondensation reaction. The choice of net product polymer formed thereby is not limited by the heretofore necessary requirement for a high melt strength.

It will be understood that the claims are intended to cover all changes and modifications of the preferred embodiments of the invention herein chosen for the purpose of illustration which do not constitute departures from the spirit and scope of the invention.

What is claimed is:

1. A process for making a net product comprising the steps of:
   (a) coating a template having a net structure with a first reactant chosen from a first predetermined group of polycondensation reaction polymers, said net structure having integral joints;
   (b) reacting said first reactant coated on said template with a second predetermined polycondensation reaction polymer for forming a polycondensation reaction of the second reaction polymer with said first reactant polymer;
   (c) allowing said polymerized resin coating to set to form a film on said template; and
   (d) stripping the said polymerized resin film from said template.

2. The process of claim 1 further comprising the step of orienting said polymerized resin in at least one direction for opening apertures in said film for forming a net product therefrom.

3. The process of claim 1 wherein said template is a netting structure having integral joints with joint knobs thereon.

4. The process of claim 1 wherein the first polycondensation reaction polymer is chosen from the group of polyesters, polyamides and polyester amides.

5. A net product made in accordance with the process of claim 2.

6. A light-weight film comprising a polycondensation polymer having embossed ribs thereon, said film being made in accordance with the process of claim 1 and said ribs being arranged in correspondence with the strands of said net template.

7. A light-weight net product comprising oriented strands of polymerized resin consisting of polycondensation reactants chosen from the group consisting of polyesters, polyamides and polyester amides and made in accordance with the process of claim 1.

* * * * *